United States Patent [19]

Drake et al.

[11] Patent Number: 5,315,520
[45] Date of Patent: May 24, 1994

[54] FRICTION BRAKE INTERFACE HEALTH CHECK SYSTEM FOR MULTIPLE-AXLE RAILWAY VEHICLES

[75] Inventors: John B. Drake, Cincinnati, Ohio; James A. Wood, Spartanburg, S.C.; Carl J. Slavick, Jr., Greenville, S.C.; Richard J. Mazur, Greer, S.C.

[73] Assignee: Westinghouse Air Brake Company, Wilmerding, Pa.

[21] Appl. No.: 756,021

[22] Filed: Sep. 6, 1991

[51] Int. Cl.⁵ ............................................. B60L 3/00
[52] U.S. Cl. ........................... 364/426.05; 364/424.03; 364/426.01; 246/182 B
[58] Field of Search ................. 364/426.01, 426.05, 364/550, 424.03, 424.04; 246/182 R, 182 B, 187 R, 187 B, 24 F; 303/92

[56] References Cited

U.S. PATENT DOCUMENTS

| | | | |
|---|---|---|---|
| 4,005,837 | 2/1977 | Grundy | 364/426.05 |
| 4,538,228 | 8/1985 | Brearey et al. | 364/426.01 |
| 4,835,693 | 5/1989 | Smith et al. | 364/426.05 |
| 4,999,779 | 3/1991 | Wood et al. | 303/92 |

Primary Examiner—Gary Chin
Attorney, Agent, or Firm—John B. Sotak

[57] ABSTRACT

A friction brake interface health check system for dynamically diagnosing and monitoring the operational status of a plurality of input signals by using a pattern fault recognition and an intelligent diagnostic matrix which is generated by brake level demand, power-/brake trainline, electric brake feedback and electric brake rate request modules to control an interface health determination fault monitor module which determines which errors are to be reported to the event interface file, the RAM fault log and which are displayed on a seven (7) segment display.

18 Claims, 3 Drawing Sheets

FRICTION BRAKE INTERFACE HEALTH CHECK SYSTEM FOR MULTIPLE-AXLE RAILWAY VEHICLES

BACKGROUND OF THE INVENTION

This invention relates to a circuit arrangement which performs a functional integrity check by polling the friction brake input signals and determining the actual operational status of each specific input and, more particularly, to an electronic friction brake interface health check system for dynamically diagnosing the primary input signals for effectively ascertaining both the requested braking rate and the required output of the friction brake equipment of a multiple-axle railway vehicle.

FIELD OF THE INVENTION

In modern high speed railway and mass and/or rapid transit operation, it is essential to ascertain that the actual rate of braking effort being exerted on the vehicle or train is in accordance with the requested brake command signal initiated by the engineer or train operator. Presently, there is no known apparatus which can predict and distinguish an internal from an external faulty railway friction brake problem in a dynamic or static environment. That is, it is highly advantageous to provide the consumer, namely, the railway or transit operator, with detailed and comprehensive diagnostic data on the operation of the friction brake conditions in order to achieve safe and effective braking of the railway vehicle. In addition, it is advantageous from a cost and an operational standpoint to readily determine the exact point of an existing problem in order to prevent the unnecessary replacement of suitable operating and fault-free devices and apparatus of the braking system.

OBJECTS AND SUMMARY OF THE INVENTION

Accordingly, it is an object of this invention to provide a friction brake interface health check arrangement which is capable of dynamically diagnosing the operational status of the friciton brake interface signals.

Another object of this invention is an electronic circuit apparatus in which the friction brake interface signals are utilized to determine both the requested braking rate and the required output of the friction brake equipment.

A further object of this invention is to provide a unique process which employs an intelligent pattern fault recognition and a time varying fault tolerance to provide a comprehensive check on the primary signals used by the friction brake control equipment.

Yet another object of this invention is to provide a novel arrangement which can dynamically differentiate between a problem in the signal originating in a friction brake electronic circuit and a problem of a signal supplied to the friction brake electronic circuit.

Yet a further object of this invention is to provide a unique diagnostic system for providing an operational insight which may be used by the personnel of the railway operator to diagnose and correct both an internal and external fault condition of the electronic unit or the friction brake signal circuit.

Still a further object of this invention is to provide a friction brake interface health check system for a multiple-axle railway vehicle comprising, first means responsive to a requested brake level demand signal for producing a first logical signal when a normal condition is present and for producing a second logical signal when an error condition exists, second means responsive to a power brake trainline signal for producing a first logical signal when a normal condition is present and for producing a second logical signal when an error condition exists, third means responsive to an electric brake feedback signal for producing a first logical signal when a normal condition is present and for producing a second logical signal when an error condition exists, fourth means for producing a first logical signal when the electric brake feedback signal is within an acceptable range and for producing a second logical signal when the electric brake feedback signal is outside of the acceptable range, and fifth means for monitoring the logical signals received from the first, second, third, and fourth means for developing a fault matrix.

Still another object of this invention is to provide a system for dynamically diagnosing the existence of a signal fault condition in friction brake equipment comprising a brake level demand circuit check module being connected to a brake level demand oscillation check circuit and to a brake level demand range determination circuit, the brake level demand range determination circuit being connected to a brake level demand timer circuit, the brake level demand oscillation circuit, the brake level demand range determination circuit, and the brake level demand timer circuit being connected to a brake level interface health check circuit with is connected to an interface health determination fault monitor circuit, a power/brake trainline circuit check module being connected to a power/brake trainline oscillation check circuit and to a power/brake trainline timer circuit the power/brake trainline oscillation check circuit and the power/brake trainline timer circuit being connected to a power/brake interface health check circuit which is connected to the interface health determination fault monitor circuit, an electric brake feedback circuit check module being connected to an electric brake feedback oscillation check circuit and to an electric brake feedback rate check circuit, the electric brake feedback oscillation check circuit and the electric brake feedback rate check circuit being connected to an electric brake interface health check circuit which is connected to the interface health determination fault monitor circuit, a requested brake rate calculator circuit being connected to an electric brake rate request comparator circuit which is connected to the interface health determination fault monitor circuit which monitors the specific failure characteristics of each of a plurality of friction brake interface input signals of the system.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIGS. 1a, 1b, and 1c illustrate a schematic circuit block diagram which, when placed in side-by-side relationship, namely, when FIG. 1a is disposed to the left FIG. 1b is centrally disposed and FIG. 1c is disposed to the right of a dynamic friction brake interface health check system in accordance to the present invention.

DETAILED DESCRIPTION OF THE INVENTION

Figure 1A:
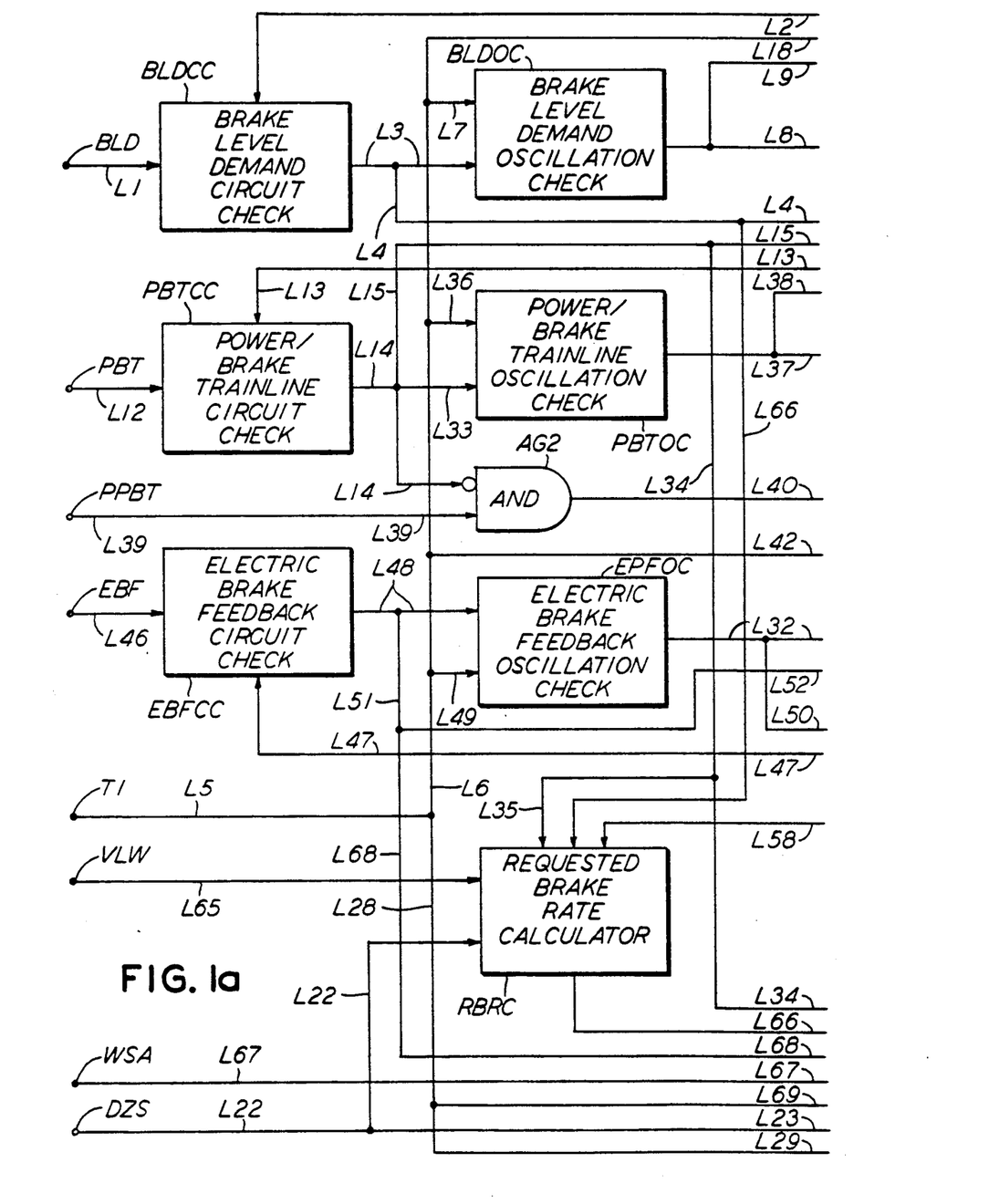
Figure 1B:
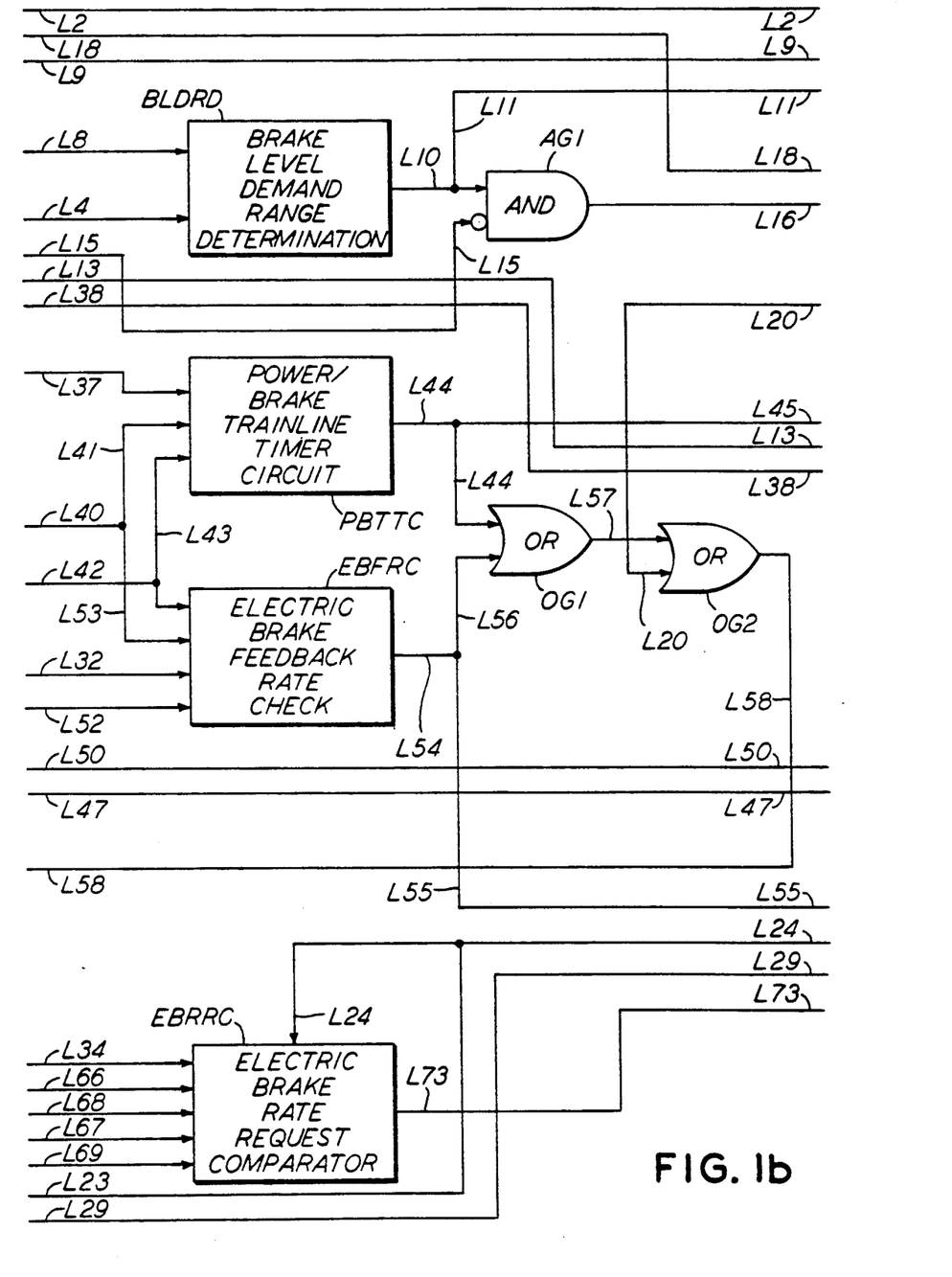
Figure 1C:
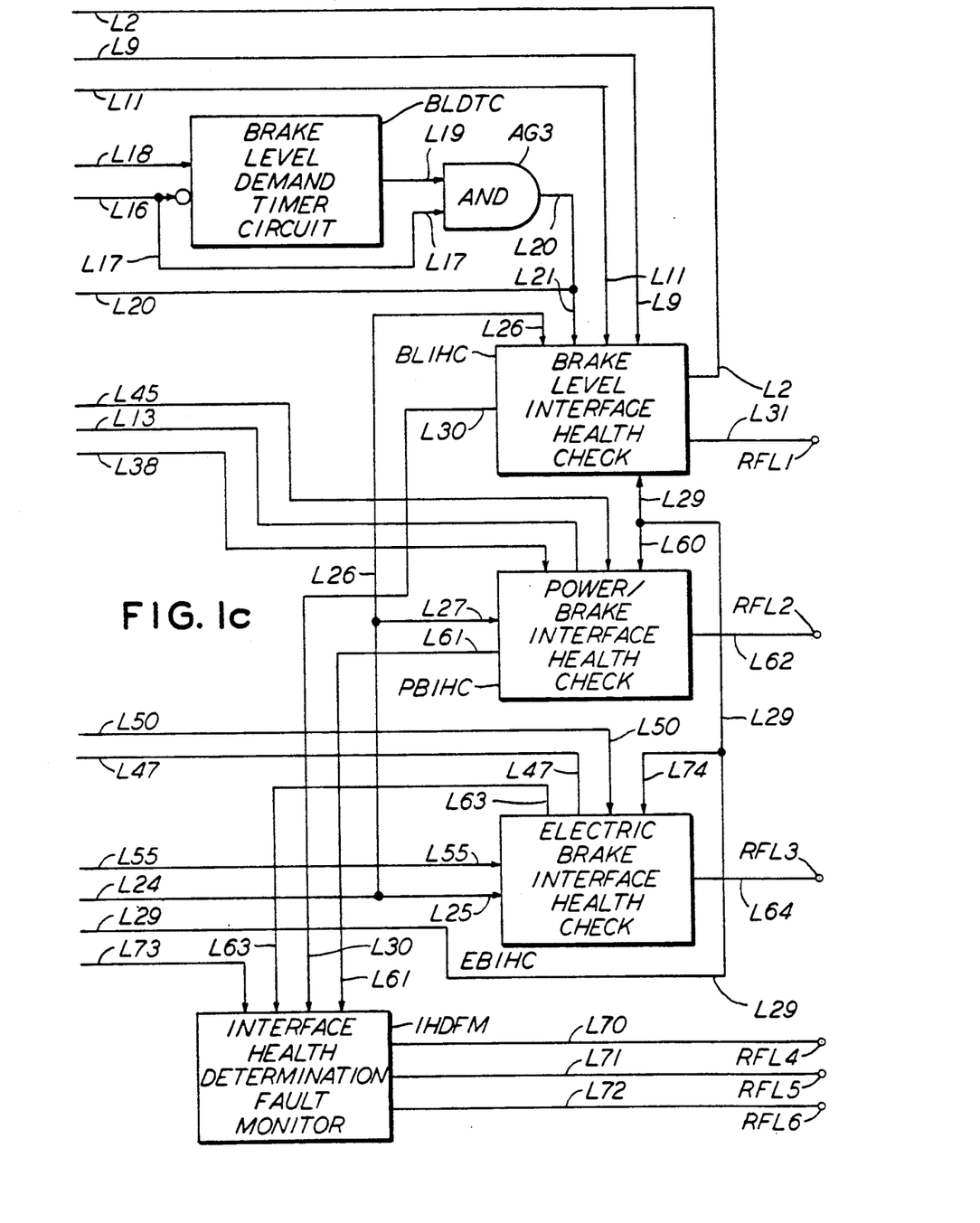

Referring now to FIGS. 1a, 1b, and 1c of the drawings, there is shown a friction brake interface health check circuit arrangement for railway vehicles. In operation, the health check system uses pattern fault recognition and an intelligent diagnostic matrix in the determination of the operational status of the friction brake interface signals. The pattern fault recognition function is based upon the specific failure characteristics of each of the friction brake interface signals employed on the railway car. In practice, the pattern faults require that there is a specific combination of erroneous inputs to exist before an interface signal fault is defined and acknowledged. The intelligent diagnostic matrix utilizes the acknowledged interface signal faults to determine the operational status of each friction interface signal as well as the operational status of the total friction brake interface system. Thus, the combined fault analysis system provides a superior and more accurate detection and reporting arrangement.

As shown in FIG. 1a, an input terminal BLD is connected to one input of a brake level demand circuit check block or module BLDCC via lead L1 while another input on the brake level circuit check module BLDCC is connected by lead L2 from output of a brake level interface health check circuit BLIHC as will be described in detail hereinafter. It is sufficient to say at this time that the signal on lead L2 is either a low, namely, a logical "0" or a high, namely, a logical "1". Normally, the signal state is a low which is a logical "0". It will be appreciated that the brake level demand signal on terminal BLD is representative of a given requested braking rate for the railway vehicle. This input signal varies from a numerical value of zero (0) which signifies a full brake release condition through a numerical progression up to a value of two hundred and fifty-five (255) which is representative of a full brake application condition. It will be observed that the brake level demand circuit module check BLDCC monitors the input fed from the output of the brake level interface health check circuit BLIHC. When the logical input signal supplied to lead L2 from brake level interface health circuit BLIHC is a low, the brake level demand circuit check module BLDCC outputs the given brake level demand signal supplied the command system. Conversely, if the input signal furnished by the brake level interface health check circuit BLIHC is a high, the brake level demand circuit check module BLDCC will output a specific brake level signal value until the input on lead L2 is a logical "0" which occurs by the transition in the brake level interface health check module BLIHC. It will be noted that during this test, the output to the brake control portion on the vehicle is not modified and that the braking effort remains at the same requst level as that which it was before the test was initiated. The output of the brake level demand circuit check module BLDCC is fed to one input of the brake level demand oscillation check circuit or module BLDOC via lead L3 as well as to one input of the brake level demand range determination circuit or module BLDRD via leads L3 and L4.

It will be seen that the other input of the brake level demand oscillation check block BLDOC is connected to a timer input terminal TI via leads L5, L6 and L7. The timing signals provide an accurate clock pulse for the brake level demand oscillation check circuit BLDOC. The brake level demand oscillation check module BLDOC monitors the brake level demand input signals derived from the brake level demand circuit check module BLDCC for signal fluctuations. If there is an indication of the existence of a signal fluctuation of greater than fifty (50) bits, the brake level demand oscillation check circuit BLDOC starts a timer to monitor the number of fluctuations that occur within a given period of time. For example, when a signal fluctuation exists, a timer in the brake level demand oscillation check circuit is started to monitor the number of fluctuations that occur within a five (5) second time period. If more than three fluctuations take place within the five (5) second time period, the brake level demand oscillation circuit BLDOC produces a high or a logical "1", and otherwise it outputs a low or a logical "0". It will be seen that the output of the brake level demand oscillation check circuit BLDOC is connected to the input of a brake level demand range determination circuit or module BLDRD via lead L8 and is also connected to the input of the brake level interface health check circuit BLIHC via leads L8 and L9. Under normal conditions, when less than three (3) fluctuation signals occur within the five (5) second period, the brake level demand oscillation check circuit BLDOC outputs a low or a logical "0" to the inputs of the brake level demand range determination circuit BLDRD and the brake level interface health check circuit BLIHC. Conversely, if more than three (3) fluctuations occur during the five (5) second period, the brake level demand oscillation check circuit BLDOC outputs a high or a logical "1" to the inputs of the brake level demand range determination circuit BLDRD and the brake level interface health check circuit BLIHC, which signifies an error operating mode.

As previously mentioned, the output signal from the brake level demand circuit check module BLDCC is the requested brake rate which may numerically vary from zero (0), a full brake release condition to two-hundred and fifty-five (255), full brake application condition. As noted above, the output of brake level demand oscillation check circuit BLDOC is either a low (0) signal or a high (1) signal. The brake level demand range determination module BLDRD monitors the output of the brake level demand oscillation module BLDOC for a low (0) state which indicates that a normal condition exists. If a normal condition is present, the brake level demand range determination module BLDRD performs a range check to determine if the brake level demand signal received by the brake level demand circuit check module BLDCC is outside of an acceptable range. If the value of the input signal is within an acceptable range, a normal condition exists and the brake level demand range determination module BLDRD outputs a low or a logical "0". If the value of the input signal is not within the acceptable range, the brake level demand range determination module BLDRD outputs a high or a logical "1" which indicates an error mode of operation exists.

If the input on lead L8 is a high or logical "1", which indicates that signal oscillations are produced by the brake level demand oscillation check module BLDOC, the brake level demand range determination module BLDRD will not initiate a range check of the brake level demand signal so that the brake level demand range determination module BLDRD outputs a low or a logical "0". It will be understood that when normal brake level conditions exist or when signal oscillations are diagnosed as being produced by the brake level demand oscillation check module BLDOC so that the brake level demand range determination module BLDRD outputs a low or a logical "0". As shown, the output of the brake level demand range determination circuit BLDRD is connected to one input of a two-input AND gate circuit AG1 via lead L10 and is also connected to the input of the brake level interface health check module BLIHC via leads L10 and L11. It will be appreciated that when the brake level range is violated, the brake level demand range determination circuit BLDRD outputs a high or a logical "1" to the AND gate AG1 and to the brake level interface health check module BLIHC.

As shown in FIG. 1a, a power/brake trainline terminal PBT is connected to one input of power/brake trainline circuit check module PBTCC via lead L12 while another input of the power/brake trainline circuit check module PBTCC is connected by lead L13 to the output of a power/brake interface health check circuit or module PBIHC. The signal developed on the terminal PBT annunciates and signifies if the vehicle or train is in a power or brake mode. If the power/brake trainline signal is a low or a logical "0", the vehicle is in a brake mode, and if the power/brake trainline signal is a high or a logical "1", the vehicle is in mode. It will be seen that the output of the power/brake trainline circuit check module PBTCC is connected to one input of a two-input AND gate circuit AG2 via lead L14. As shown, the output signal on lead L14 is inverted as is indicated by the inversion input circle.

It will be noted that the output of the power/brake trainline circuit check block PBTCC is also connected to the other input of the AND gate AG1 via leads L14 and L15. This signal is inverted as signified by the input inversion circle. The AND gate AG1 performs an AND logic function on the input signals received from the power/brake trainline circuit check mode PBTCC and the brake level demand range determination module BLDRD. When the power/brake trainline circuit check module PBTCC outputs a low or a logical "0", namely, a brake mode, and the brake level demand range determination circuit BLDRD outputs a high or a logical "1", namely, a brake signal range check fault, the AND gate AG1 produces a high or a logical "1". It will be appreciated that, for any other combination of input signals, the AND gate AG1 produces a low or a logical "0" which indicates a normal mode of operation exists. The output of the AND gate AG1 is connected to the input of a brake level demand timer circuit BLDTC via lead L16 and is also connected to one input of a two-input AND gate circuit AG3 via leads L16 and L17. The timing signals appearing on input terminal TI are conveyed to an input of the brake level demand timer circuit BLDTC via leads L5, L6 and L18. The timing signals provide precise clock pulses for the brake level demand timer circuit BLDTC. As noted above, the output from the AND gate AG1 is a high or a logical "1" when the vehicle is in the brake mode of operation and the brake level demand signal signifies range check faults. Conversely, the output from the AND gate AG1 is a low or logical "0" when normal operating conditions exist. As previously noted, a NOT operation is performed on the output of AND gate AG1, namely, the signal state to the input of the brake level demand timer circuit BLDTC is inverted as shown by the inversion circle. The function of the brake level demand timer circuit BLDTC is to monitor the inverted output of the AND gate AG1 for a transition to a low or a logical "0" state. When this transition condition occurs, the brake level demand timer circuit BLDTC monitors the AND gate AG1 for a continuous low output state over a duration of one-hundred (100) milliseconds. If this situation persists, an error mode of operation exists. Under this condition, the brake level demand timer circuit BLDTC outputs a high or a logical "1" to indicate the presence of the error mode. It will be understood that any other combination of inputs will cause the brake level demand timer circuit BLDTC to output a low or a logical "0".

As shown, the third AND gate circuit AG3 performs an AND function of the input from the first AND gate AG1 via lead L17 and the input from the brake level demand timer circuit BLDTC via lead L19. Accordingly, when the input signal from the brake level demand timer circuit BLDTC is a high or a logical "1", due to the AND gate AG1 being a low or a logical "0" for a 100 millisecond time period and the signal from the AND gate AG1 is a high or logical "1", signifying that the vehicle is in a brake mode and indicating the presence of range check faults, the output of the AND gate AG3 is a high or a logical "1". It will be appreciated that any other combination of inputs will cause the AND gate AG3 to produce a low or a logical "0".

It will be noted that the output of the AND gate AG3 is connected to one input of a two-input OR gate circuit OG2 via lead L20 and is also connected to an input of the brake level interface health check circuit BLIHC via leads L20 and L21. Now when the output signal from the brake level demand timer circuit BLDTC is a high or a logical "1" and the output signal from the AND gate AG1 is a high or logical "1" and the output signal from the AND gate AG3 is a high or logical "1", the output to the brake level interface health check circuit is a high or logical "1" and the output to the OR gate OG1 is a high or a logical "1".

It will be observed that a dead zero speed terminal DZS is connected to one input of a requested brake rate calculator module RBRC via lead L22 and is also connected to an input of electric brake rate request comparator EBRRC via leads L22, L23 and L24. In addition, terminal DZS is connected to an input of an electric brake interface health check circuit or module EBIHC via leads L22, L23, L24, and L25 and is also connected to a power/brake interface health check circuit or module PBIHC via leads L22, L23, L24, L26 and 127. Further, the terminal DZS is connected to an input of the brake level interface health check circuit BLIHC via leads L22, L23, L24, and L26. The signal on the dead zero speed terminal DZS is a high or a logical "1" when the vehicle is in a zero speed condition, namely, the brakes are applied and the car speed is at zero (0) mph for at least a ten (10) second time period. On the other hand, the dead zero speed signal is a low or a logical "0" for all other conditions. As mentioned above, the output signal from the AND gate AG3 is a high or a logical "1" when the output from the AND gate AG1 is a high or a logical "1" and the output from the brake level demand timer check circuit BLDTC is a high or a logical "1". The brake level demand range determination module BLDRD outputs a low or a logical "0" when normal conditions exist, namely, when the range checks are within acceptable limits. Otherwise, brake level demand range determination circuit BLDRD outputs a high or a logical "1". The output signal of the brake level demand oscillation check circuit BLDOC is either a low or a logical "0" or a high or a logical "1". The timer input terminal TI provides an accurate timing signal and is connected to an input of the brake level interface health check circuit BLIHC via leads L5, L28 and L29.

Now when the dead zero speed input signal undergoes a transition from a logical "0" to a logical "1", the brake level interface health check module BLIHC determines if the AND gate AG3 has produced a logical "1" since the last check. If this condition has occurred, the brake level interface health check circuit BLIHC outputs a logical "1" for a one-hundred and twenty (120) millisecond time period to the brake level demand circuit check module BLDCC. After a hundred (100) millisecond time period has elapsed, the brake level interface health check circuit BLIHC monitors the output of the brake level demand oscillation check module BLDOC as well as the output of the brake level demand range determination module BLDRD for a low or a logical "0" state feedback which signifies a normal mode of operation. Accordingly, if the expected low state is not present at either of the outputs before a one-hundred and twenty (120) millisecond time period has expired, the brake level interface health check module BLIHC outputs a high or a logical "1" error signal to the interface health determination fault monitor module via lead L30.

The following is a matrix of the inputs to the brake level interface health check module BLIHC for analyzing the BLIHC fault responses:

| PATTERN | BLIHC FAULT MATRIX | | | | |
|---|---|---|---|---|---|
| | (DZS) Static | BLDOC | BLDRD | AG2 | FAULT |
| 1 | High | High | High | High | BLDCF |
| 2 | High | High | High | Low | BLDCF |
| 3 | High | High | Low | High | BLDCF |
| 4 | High | High | Low | Low | BLDOCF |
| 5 | High | Low | High | High | BLDRCF |
| 6 | High | Low | High | Low | BLDCF |
| 7 | High | Low | Low | High | BLDAGF |
| 8 | High | Low | Low | Low | BLDSIF |
| 9 | Low | High | High | High | BLDOF |
| 10 | Low | High | High | Low | BLDOF |
| 11 | Low | High | Low | High | BLDOF |
| 12 | Low | High | Low | Low | BLDOF |
| 13 | Low | Low | High | High | BLDRF |
| 14 | Low | Low | High | Low | BLDCT |
| 15 | Low | Low | Low | High | BLDCT |
| 16 | Low | Low | Low | Low | No Fault |

It will be appreciated that the above matrix determines the manner in which the various combinations of errors are reported and conveyed to the RAM fault log terminal RFL1 via lead L31. The mnemonics of the lowest level replaceable unit (LLRU) faults are as follows:

| Acronym | Description |
|---|---|
| BLDOF | Brake Level Demand Oscillation Fault |
| BLDCF | Brake Level Demand Circuit Fault |
| BLDOCF | Brake Level Demand Oscillation Circuit Fault |
| BLDRCF | Brake Level Demand Range Circuit Fault |
| BLDAGF | Brake Level Demand AND Gate Fault |
| BLDSIF | Brake Level Demand Signal Interface Fault |
| BLDRF | Brake Level Demand Range Fault |
| BLDCT | Brake Level Demand Check Test (requires a dynamic test of the circuit-is not a fault) |

It will be appreciated that the brake level interface health check module BLIHC outputs a high or a logical "1" to the brake level demand circuit check module BLDCC for a limited time when a high or logical "1" occurs on the AND gate AG3 and when consecutive low to high input transitions are developed on the dead zero speed terminal DZS. The output of the brake level demand circuit check module BLDCC is a low or logical "0" for any other condition. On the other hand, the brake level interface health check circuit BLIHC outputs a high or a logical "1" to the interface health determination fault monitor module IHDFM when a low or logical "0" output from the brake level demand oscillation check circuit BLDCC or from the brake level demand range determination circuit BLDRD has not occurred during the 120 millisecond conditional test period. For any other condition, the output supplied to the input of the interface health determination fault monitor module IHDFM via lead L30 is a low or a logical "0". It will be understood that a low or a logical "0" from the brake level interface health check circuit BLIHC signifies a normal mode of operation is exhibited by the brake level demand circuitry.

As previously noted, one input of the power/brake trainline circuit check module PBTCC is connected to the terminal PBT which annunciates when the vehicle is in a power mode or a brake mode. The input signal is either a low or a logical "0" which signifies a brake mode of operation or a high or a logical "1" which signifies a power mode of operation. It will be seen that another input of the power brake trainline circuit check module PBTCC is connected to the output of a power/brake interface health check circuit or module PBIHC via lead L13. The output of the power/brake interface health check module PBIHC is either a high or a logical "1" or a low or a logical "0" which indicates a normal mode of operation. The power brake trainline circuit check module PBTCC monitors the logic output signal received from the power/brake interface health check module PBIHC. Now when the output of the power/brake interface health check circuit PBIHC is a low or a logical "0", the power/brake trainline circuit check module PBTCC produces a certain power/brake trainline signal to the system. That is, if the output from the power brake interface health check circuit PBIHC is a high or a logical "1", the power/brake trainline circuit check PBTCC outputs a specific power/brake trainline signal until the logic input signal from the power/brake interface health check module PBIHC undergoes a transition to a low or a logical "0". It should be noted that, when this test occurs, the output to the brake control portion is not altered so that the effective braking effort remains at the exact requested level that existed before the test was initiated. The power/brake trainline circuit check module PBTCC outputs a power/brake trainline signal to the power/brake trainline oscillation check module PBTOC via leads L14 and L33 and to the AND gate AG1 via leads L14 and L15 as well as to the AND gate AG2 via lead L14. In addition, the output of the power/brake trainline circuit check module PBTCC is connected to an input of a requested brake rate calculator module RBRC via leads L14, L15, L34, and L35. It will be appreciated that the signal is either a low or a logical "0" which represents a brake mode of operation or a high or a logical "1" which signifies a power mode of operation. It will be seen that the power/brake trainline oscillation check circuit PBTOC monitors the output of the power/brake trainline circuit check module PBTCC on leads L14 and L33 while precise timing signals are received from terminal TI via leads L5, L6, and L36. If signal oscillation exists, the power/brake trainline oscillation check circuit PBTOC starts a timer to monitor the number of oscillations occurring within a predetermined period of time, such as, a five (5) second time period. If more than three (3) oscillations occur within the five (5) second time period, the power/brake trainline oscillation check module PBTOC outputs a high or a logical "1". Conversely, the output of the power/brake trainline oscillation check circuit PBTOC is a low or a logical "0" when a normal mode of operation exists. When a normal signal condition prevails, a low or a logical "0" signal is conveyed to a power/brake trainline timer circuit PBTTC via lead L37 and is conveyed to a power/brake interface health check module PBIHC via leads L37 and L38. Now if signal oscillations appear at least three (3) times within the 5-second period, the power/brake trainline oscillation timer circuit PBTOC outputs a high or a logical "1" to the inputs of power/brake trainline timer circuit PBTTC and power/brake interface health check circuit PBIHC.

As previously noted, the output of the power/brake trainline circuit check module PBTCC is the power/brake trainline signal which annunciates to the system whether the vehicle is in either a power mode or a brake mode. If the vehicle is in a brake mode of operation, the signal produced by the power/brake trainline circuit check module PBTCC is a low or a logical "0" while if the vehicle is in a power mode of operation, the signal produced by the power/brake trainline circuit check module PBTCC is a high or a logical "1". It will be noted that the logical signal developed on lead L14 is inverted before it is applied to the input of the AND gate AG2. The previous power/brake trainline signal developed on terminal PPBT annunciates to the system whether the vehicle was in a power mode or a brake requested mode during the previous program cycle. It will be appreciated that the gate AG2 performs an AND operation on the inputs received from the power/brake trainline circuit check module PBTCC and the previous power/brake trainline signal conveyed to the other input via lead L39. Now when the unmodified input signal from the power/brake trainline circuit check module PBTCC is a low or logical "0" and the input signal on the previous power/brake trainline terminal PPBT is a high or a logical "1", which represents a transition from a power to a brake mode, the output of the AND gate AG2 is a high or a logical "1". For any other combination of inputs, the AND gate AG2 outputs a low or a logical "0". The output of the AND gate AG2 is connected to an input of the power/brake trainline time circuit PBTTC via leads L40 and L41. It will be understood that the output signal of the power/brake trainline oscillaltion check circuit PBTOC will produce a low or a logical "0" when a normal power/brake trainline signal condition exists, namely, during a non-oscillating state, otherwise the power/brake trainline oscillation check module PBTOC produces a high or a logical "1". As shown, the highly accurate timing pulses developed on terminal TI are conveyed to an input of the power/brake trainline timer circuit via leads L5, L6, L42 and L43. The power/brake trainline timer circuit PBTTC monitors the output received from the AND gate AG2. That is, it checks when a transition from a low to a high state occurs. When a transition takes place, the power/brake trainline timer circuit PBTTC monitors the output of the power/brake trainline oscillation circuit PBTOC for the occurrence of a high or a logical "1", namely, the presence of signal oscillations during the first two (2) seconds of the transition time period. If the signal oscillation condition occurs during the two (2) second time period, the power/brake trainline timer circuit PBTTC outputs a high or a logical "1" otherwise the power/brake trainline timer circuit PBTTC outputs a low or a logical "0" which signify a normal mode of operation. When the output of the AND gate AG2 is a high or a logical "1" and the output from the power/brake trainline oscillation circuit PBTOC has remained a constant low or logical "0" for a two (2) second time period, the power/brake trainline timer circuit PBTTC outputs a low or a logical "0" to OR gate OG1 via lead L44 and also outputs a low or a logical "0" to the power/brake interface health check module PBIHC via leads L44 and L45. If the power/brake trainline oscillation check module PBTOC outputs a high or a logical "1" during the two (2) second time period, the power/brake trainline timer circuit PBTTC outputs a high or a logical "1" to the OR gate OG1 and also outputs a high or a logical "1" to the power/brake interface health check module PBIHC.

It will be appreciated that an electric brake feedback signal is developed on terminal EBF which is connected to an input of an electric brake feedback circuit check module EBFCC via lead L46. The electric brake feedback signal contains information concerning the amount of regenerative or electric braking effort which is presently being exerted on the vehicle. The input feedback signal varies from a numerical value of zero (0) which signifies that there is no regenerative brake effort through a valve of two hundred and fifty-five (255) which represents a full regenerative braking effort. In addition, it will be seen that an output of the electric brake interface health check circuit EBIHC is connected to another input of the electric brake feedback circuit check module EBFCC via lead L47. The state of the signal can be either a high or a logical "1" or a low or a logical "0" in which the normal state of the signal is a low or a logical "0". Normally, the electric brake feedback circuit check module EBFCC monitors the input signal received from the electric brake interface health check circuit EBIHC. When the input received from the electric brake interface health check module is a low or a logical "0", the electric brake feedback circuit check module EBFCC supplies the system with the applied electric brake feedback signal. Conversely, when input received from the electric brake interface health check circuit EBIHC is a high or a logical "1", the electric brake feedback circuit check module EBFCC outputs a specific electric brake feedback signal, such as, a fifty (50) bits until the logical input received from the electric brake interface health check module EBIHC reverts to a low or a logical "0". When this particular test takes place, the output to the brake control portion of the system remains the same and is not modified. Thus, the braking effort remains at the same requested level which was established before the test was initiated. The electric brake feedback circuit check module EBFCC outputs an electric brake feedback signal to one input of an electric brake feedback oscillation check circuit EBFOC via lead L48 and also to an input of electric brake feedback rate check module EBFRC via leads L48, L51, and L52. As shown, the timing signal developed of timer input terminal TI to conveyed to another input of the electric brake feedback oscillation circuit EBFOC via leads L5, L6, and L49. In practice, the electric brake feedback oscillation circuit EBFOC monitors the electric brake feedback input signal received from the electric brake feedback circuit check module EBFCC to determine if there is any signal fluctuations. If a signal fluctuation condition exists and if the fluctuations are greater than fifty (50) bits, the electric brake feedback oscillation check module EBFOC starts a timer to monitor the number of fluctuations which occur during a five (5) second time period. If more than three (3) fluctuations are sensed in the five (5) second period, the electric brake feedback oscillation check circuit EBFOC outputs a high or a logical "1", and if the signal conditions are normal, the electric brake feedback oscillation check module EBFOC outputs a low or a logical "0". Thus, when normal signal conditions exist, the electric brake feedback oscillation check module EBFOC outputs a low or a logical "0" to an input of the electric brake interface health check circuit EBIHC via leads L32 and L50 and also to an input of the electric brake feedback rate check circuit EBFRC via lead L32. If repeated signal fluctuations are developed on the electric brake feedback signal, the electric brake feedback oscillation check circuit EBFOC produces a high or a logical "1" which is conveyed to both the electric brake feedback rate check module EBFRC and the electric brake interface health check module EBIHC.

It will be appreciated that the output of the AND gate AG2 is a high or a logical "1" when the vehicle is in a transition from a power mode to a brake mode and is a low or a logical "0" for all other conditions. In operation, the electric brake feedback rate check circuit EBFRC monitors the output received from the AND gate AG2 to determine if a transition to a high or a logical "1" has occurred. When such a transition condition takes place, the electric brake feedback rate check module EBFRC then monitors the output received from the electric brake feedback oscillation check circuit EBFOC to ascertain if a low or a logical "0" exists. While the conditional state exists, the electric brake feedback rate check circuit EBFRC monitors the electric brake feedback signal which is received from the electric brake feedback circuit check module EBFCC via leads L48, L51 and L52. In operation, the signal is increased above a predetermined acceptable level. This is accomplished by monitoring the electric brake feedback signal change during a two (2) second time period which starts when a transition occurs to the AND gate AG2. If the signal does increase above the preset limit, the electric brake feedback rate check circuit EBFRC outputs a low or a logical "0" which denotes a normal mode of operation. If the signal does not increase above the preset limit, the electric brake feedback rate check circuit EBFRC outputs a high or a logical "1". After the output of the AND gate AG2 experiences a transition from a low or logical "0" to a high or a logical "1", which is conveyed via leads L40 and L53 to an input of the electric brake feedback rate check module EBFRC. Now the electric brake feedback rate check circuit EBFRC monitors the output of the electric brake feedback oscillation check circuit EBFOC to determine if it is being maintained at a constant low state. Under this condition, the electric brake feedback rate check circuit EBFRC also monitors the electric brake feedback signal to ensure that the signal increases above a preset acceptable limit. If the signal in fact increases to a value above the preset acceptable level, the electric brake feedback rate check circuit EBFRC outputs a low or a logical "0" to the electric brake interface health check circuit EBIHC via leads L54 and L55 and also the OR gate OG1 via leads L54 and L56. The low logical state denotes a normal mode of operation. For any other combination of input signals, the electric brake feedback rate check module EBFRC outputs a high or a logical "1" to the electric brake interface health check module EDIHC and OR gate OG1 to denote that there is an error mode of operation.

It will be noted that during an error mode of operation, the power/brake trainline timer circuit PBTTC produces a high or a logical "1" which signifies that the power/brake trainline signal is experiencing signal oscillations. In the absence of signal oscillations, the power/brake trainline timer circuit PBTTC outputs a low or a logical "0" which denotes a normal mode of operation. Further, the electric brake feedback rate check circuit EBFRC produces a high or a logical "1" when the electric brake feedback signal is not within the confines of an acceptable "Jerk" limit mode of operation. Conversely, the electric brake feedback rate check circuit EBFRC outputs a low or a logical "0" which signifies a normal mode of operation. The OR gate circuit OG1 performs a logical OR operation in response to the logical signals received from the power/brake trainline timer circuit PBTTC and the electric brake feedback rate check circuit EBFRC. When the output signals from the power/brake trainline timer circuit PBTTC and the electric brake feedback rate check circuit EBFRC are both a low or a logical "0", the output signal of the OR gate OG1 is also a low or a logical "0" which signifies that the system is operating within the established specification. On the other hand, when either or both inputs are high or a logical "1", the OR gate OG1 produces a high or a logical "1" which denotes an error mode of operation.

It will be seen that the output of the OR gate OG1 is connected to one input of the two-input OR gate circuit OG2 via lead L57. The other input of the OR gate OG2 is connected to the output of the AND gate AG3 via lead L20. The output of the OR gate OG1 is high or a logical "1" when the output signal of the power/brake trainline timer circuit PBTTC is a high or a logical "1" or when the output signal of the electric brake feedback rate check circuit is a high or a logical "1". The high or logical "1" signal of the OR gate OG1 signifies an error mode of operation. A low or a logical "0" output signal of the OR gate OG2 signifies a normal mode of operation. The OR gate OG2 performs a logical OR operation which is responsive to the inputs derived from the AND gate AG3 and the OR gate OG1. Thus, when the output signal of the AND gate AG3 is low or a logical "0" and the output of the OR gate OG1 is low or a logical "0", this signifies the power/brake trainline, the brake level demand signal and the electric brake feedback signal are operating in accordance with the system specification. That is, when the output of the OR gate OG2 is a low or logical "0", it denotes a normal mode of operation. If either or both of inputs are a high or a logical "1", the output of the OR gate OG2 is a high or a logical "1" which signifies an error mode of operation. It will be noted that the output of the OR gate OG2 is connected to an input of a requested brake rate calculator module RBRC via lead L58. Thus, when the AND gate AG3 supplies a low or a logical "0" to the OR gate OG2 and the OR gate OG1 supplies a low or a logical "0" to the OR gate OG2, the output of the OR gate OG2 conveys a low or a logical "0" to the requested brake rate calculator circuit RBRC. An error mode condition exists when the OR gate OG2 supplies a high or a logical "1" to the requested brake rate calculator circuit RBRC. As shown, the dead zero speed signal developed on terminal DZS is conveyed to an input of the requested brake rate calculator circuit RBRC via lead L22. When the vehicle is in a zero speed state, namely, the brakes are applied and the car is at zero speed for ten (10) seconds, the dead zero speed signal is a high or logical "1". For all other conditions, the dead zero speed signal is a low or a logical "0".

The output of the power/brake trainline timer circuit PBTTC is a low or a logical "0" when the output of the AND gate AG2 is a high or a logical "1" and the output of the power/brake trainline oscillation check circuit PBTOC remains at a constant low or a logical "0" for a two (2) second time period. Thus, when the power/brake trainline timer circuit PBTTC outputs a high or a logical "1", it denotes that an error mode of operation exists. It will be understood that the power/brake trainline oscillation check circuit PBTOC is at a low or a logical "0" when a normal power/brake trainline signal condition exists, and that the occurrence of repeated signal oscillations will cause the power/brake trainline oscillation check circuit PBTOC to assume a high or a logical "1" which denotes an error mode exists on the power/brake signal. Again, the input timer signal on terminal TI provides an accurate timing source for the power/brake interface health check module via leads L5, L28, L29, and L60. Now when the dead zero speed input signal undergoes a transition from a low or a logical "0" state to a high or a logical "1" state, the power/brake interface health check circuit PBIHC determines if the power/brake trainline timer circuit module PBTTC has produced a high or a logical "1" since the last check. If such a condition has occurred, the power/brake interface health check circuit PBIHC outputs a high or a logical "1" to the power/brake trainline circuit check module PBTCC for a one-hundred and twenty (120) millisecond time period. After a one-hundred (100) millisecond time period has elapsed, the power/brake interface health check module PBIHC monitors the power/brake trainline oscillation check module PBTOC to determine if its output is a low or a logical "0" which is a normal mode of operation. On the other hand, if the anticipated low or logical "0" state is not present before the expiration of the 120 millisecond period, the power/brake interface health check circuit PBIHC outputs a high or a logical "1" to the input of the interface health determination fault monitor module IHDFM via lead L61. The high or logical "1" denotes an error mode condition in the system input signal. The power/brake interface health check module PBIHC outputs a high or a logical "1" for a limited period of time to the power/brake trainline circuit check module PBTCC when a high or a logical "1" is present on the power/brake trainline circuit check module PBTCC between transitional appearances of a low or a logical "0" to a high or a logical "1" of the dead zero input signal. The power/brake interface health check circuit PBIHC outputs a high or a logical "1" to the interface health determination fault monitor module IHDFM when the power/brake trainline oscillation check module PBTOC experiences a low or logical "0" during the 120 millisecond conditional test period. During any other condition, the output of the interface health determination fault monitor circuit IHDFM is a low or a logical "0" which denotes a normal mode of operation.

The following is a matrix of the inputs to the power/brake interface health check module PBIHC for analyzing the PBIHC fault responses:

| PATTERN | (DZS) Static | PBTOC | PBTTC | FAULT |
|---|---|---|---|---|
| | High | High | High | PBTCF |
| | High | High | Low | PBTOCF |
| | High | Low | High | PBTTCF |
| | High | Low | Low | PBTSIF |
| | Low | High | High | PBTOF |
| | Low | High | Low | PBTCT |
| | Low | Low | High | PBTCT |
| | Low | Low | Low | No Fault |

PBIHC FAULT MATRIX

It will be apparent that the above matrix determines the manner in which the various combinations of errors are reported and conveyed to the RAM fault log terminal RFL2 via lead 62. The mnemonics of the lowest level replaceable unit (LLRU) faults are as follows:

| ACRONYM | DESCRIPTION |
|---|---|
| PBTCF | Power Brake Trainline Circuit Fault |
| PBTSIF | Power Brake Trainline Signal Interface Fault |
| PBTOCF | Power Brake Trainline Oscillation Circuit Fault |
| PBTTCF | Power Brake Trainline Timer Circuit Fault |
| PBTOF | Power Brake Trainline Oscillation Fault |
| PBTCT | Power Brake Trainline Check Test (requires a dynamic test of the circuit-is not a fault) |

As previously noted, the dead zero speed signal on terminal DZS is a high or a logical "1" when the vehicle is in a zero speed condition, namely, the brakes are applied and the car is at zero speed for a ten (10) second time period. For all other conditions, the dead zero speed signal is a low or a logical "0". It will be appreciated that the output of the electric brake feedback rate check module EBFRC is a low or a logical "0" when the AND gate AG2 changes to a high or logical "1", the electric feedback signal is within an acceptable "jerk" limit rate, and the output from the electric brake feedback oscillation check module EBFOC has constantly remained in a low or a logical "0" state for a two (2) second time period. On the other hand, the electric brake feedback rate check circuit EBFRC outputs a high or a logical "1" if and when an error mode of operation exists. The output of the electric brake feedback oscillation check circuit EBFOC will be a low or a logical "0" when a normal electric brake feedback signal condition prevails. Conversely, if there is a recurrence of repeated signal fluctuations, the electric brake feedback oscillation check circuit EBFOC will produce a high or a logical "1". It will be understood that the high or logical "1" denotes an error mode of operation is present in the electric brake feedback signal. As previously noted, the timing signals on terminal TI provide a highly accurate source of clock pulses.

Now when the dead zero speed input signal undergoes a change of state from a low or a logical "0" to a high or a logical "1", the electric brake interface health check module EBIHC will determine if the electric brake feedback rate check circuit EBFRC has produced a high or a logical "1" since the last check. If such a condition has taken place, the electric brake interface health check module EBIHC will produce a high or a logical "1" for a one-hundred and twenty (120) millisecond period of time which is conveyed to the input of the electric brake feedback circuit check module EBFCC via lead L47. After a hundred (100) milliseconds have expired, the electric brake interface health check circuit EBIHC will monitor the output of the electric brake feedback oscillation check module EBFOC to determine if a low or logical "0" state exists which signifies a normal mode of operation. If the anticipated low or logical "0" is not present before the expiration of the 120-millisecond time period, electric brake interface health check circuit EBIHC will produce a high or a logical "1" which is conveyed to the interface health determination fault monitor module IHDFM via lead L63. The high or logical "1" state signifies an error mode of operation in the system input signal. The electric brake interface health check circuit EBIHC conveys a high or a logical "1" to the electric brake feedback circuit check module EBFCC when a high or a logical "1" is developed by the electric brake feedback rate check circuit EBFRC between consecutive low or logical "0" to a high or logical "1" conditions of the dead zero speed signal. For all other conditions, the output of electric brake feedback circuit check module EBFCC is a low or a logical "0". The electric brake interface health check circuit EBIHC conveys a high or logical "1" signal to the interface health determination fault monitor module IHDFM via lead L63 when a low or logical "0" signal is developed by the electric brake feedback oscillation check circuit EBFOC during the 120-millisecond conditional test period. For any other conditions, the output of the interface health determination fault monitor module IHDFM is a low or a logical "0" which signifies a normal mode of operation. The timer input terminal provides an accurate timing signal and is connected to an input of the electric brake interface health check circuit EBIHC via leads L5, L28, L29, and L74.

The following is a matrix of the inputs to the electric brake interface health check module EBIHC for analyzing the EBIHC fault responses:

| | EBIHC FAULT MATRIX | | | |
|---|---|---|---|---|
| PATTERN | (DZ5) Static | EBFOC | EBFRC | FAULT |
| 1 | High | High | High | EBFCF |
| 2 | High | High | Low | EBFOCF |
| 3 | High | Low | High | EBFRCF |
| 4 | High | Low | Low | EBFSIF |
| 5 | Low | High | High | EBFCT |
| 6 | Low | High | Low | EBFOF |
| 7 | Low | Low | High | EBFRF |
| 8 | Low | Low | Low | No Fault |

It will be appreciated that the above table or matrix determines the manner in which the various combinations of errors are reported and conveyed to the RAM fault log terminal RFL3 via lead L64. The mnemonics of the lowest level replaceable unit (LLRU) faults are as follows:

| ACROYNM | DESCRIPTION |
|---|---|
| EBFOF | Electric Brake Feedback Oscillation Fault |
| EBFRF | Electric Brake Feedback Range Fault |
| EBFCF | Electric Brake Feedback Circuit Fault |
| EBFOCF | Electric Brake Feedback Oscillation Circuit Fault |
| EBFRCF | Electric Brake Feedback Range Circuit Fault |
| EBFSIF | Electric Brake Feedback Signal Interface Fault |
| EBFCT | Electric Brake Feedback Check Test (requires a dynamic test of the circuit-is not a fault) |

It will be understood that the vehicle load weight signal is externally supplied and is conveyed to input terminal VLW. The weight signal annunciates the vehicle passenger load which is used in the formulation of the required and most effective braking rate. The weight signal varies from a numerical zero (0) through a value of two-hundred and fifty-five (255). As previously noted, the dead zero speed signal is a high or logical "1" when the vehicle is in a zero speed condition, that is, when the brakes are applied and the zero car speed is present for a ten (10) second time period. The dead zero speed signal is a low or a logical "0" for all other conditions. The input terminal VLW is connected to an input of the requested brake rate calculator module RBRC via lead L65. The output from the brake level demand circuit check module BLDCC which is the brake level demand signal is connected to an input of the requested brake rate calculator circuit RBRC via leads L3, L4 and L66. The brake level demand signal is the requested brake rate for the vehicle. The signal varies from a numerical zero (0), a full release condition, through two-hundred and fity-five (255) a full application condition. The output of the power/brake trainline circuit check module PBTCC which is the power/brake trainline signal is connected to an input of the requested brake rate calculator via leads L14, L15, L34 and L35. The power/brake trainline signal annunciates to the system whether the vehicle is in a power mode or a brake request mode. If the power/brake trainline signal is a high or a logical "1", the vehicle is in a power mode of operation. Conversely, if the power/brake trainline signal is a low or a logical "0", the vehicle is in a brake mode of operation. It will be seen that the OR gate OG2 outputs a low or a logical "0" to the requested brake rate calculator RBRC via lead L58 when the one input from the AND gate AG3 is a low or a logical "0" and the other input from the OR gate OG1 is a low or a logical "0". The low or logical "0" state denotes a normal mode of operation. Conversely, when an output signal from the OR gate OG2 is a high or a logical "1", an error mode of operation is indicated. It will be appreciated that the requested brake rate calculating circuit RBRC monitors the output of the power/brake trainline circuit check module PBTCC to determine if a transition from a low or a logical "0" to a high or a logical "1" has occurred. When the transition occurs, the requested brake rate calculating circuit RBRC will continue to compute the requested brake rate until the power/brake trainline circuit check module PBTCC undergoes a transition back to a low or a logical "0" state or the dead zero speed input signal undergoes a transition to a high or a logical "1". The requested brake rate calculator RBRC calculates the requested brake rate by using the output received from the brake level demand circuit check module BLDCC and the vehicle load weight signal on terminal VLW. The output signal of the requested brake rate calculator varies from a numerical value of zero (0), which is a no-brake rate required, through a value of two-hundred and fifty-five (255), which is a full brake rate required. It will be seen that the output of the requested brake rate calculator RBRC is connected to an electric brake rate request comparator EBRRC via lead L66 and is activated when the power brake trainline circuit check module PBTCC assumes a high or a logical "1" and is disabled when either the power/brake trainline circuit module PBTCC switches to a low or a logical "0" or the dead zero speed input signal undergoes a transition to a high or logical "1". As noted above, the dead zero speed input signal is a high or a logical "1" when the vehicle is in a zero speed condition, namely, the brakes are applied and a zero car speed is exhibited for a ten (10) second time period. It will be noted that the dead zero speed signal is a low or a logical "0" for all other conditions.

As previously noted, the output of the power/brake trainline circuit check module PBTCC is the power/-brake trainline signal which annunciates to the system whether the vehicle is in a power mode or a brake request mode. If the power/brake trainline signal is a low or a logical "0", the vehicle is in a brake mode of operation. Conversely, if the power/brake trainline signal is a high or a logical "1", the vehicle is in a power mode of operation. It will be seen that the output of the electric brake feedback circuit check module EBFCC is the electric brake feedback signal which provides the information concerning the regenerative/electric braking level that is being supplied to the vehicle. The electric brake feedback signal can vary from a numerical zero (0) through a value up to two-hundred and fifty-five (255). It will be appreciated that a wheel slip active signal is applied to input terminal WSA which is connected to an input of the electric brake rate request comparator EBRRC via lead L67. The wheel slip active signal annunciates whether the vehicle is in a wheel slip correction mode of operation. The wheel slip correction signal is either a high or a logical "1" which denotes that a wheel slip activity is in progress or a low or a logical "0" which signifies that there is no wheel slip activity. As previously noted, the requested brake rate calculator module RBRC outputs a signal which varies from a numerical value of zero (0) which signifies that no brake rate is requested through a value of two-hundred and fifty-five (255) which signifies that a full brake rate is required.

It will be appreciated that the electric brake rate request comparator circuit EBRRC monitors the output of the power/brake trainline circuit check module PBTCC to determine if a low or logical "0" condition exists. The electric brake rate request comparator circuit also monitors the state of the wheel slip active signal on terminal WSA to determine if a low or a logical "0" condition exists and in addition it monitors the dead zero speed signal on terminal DZS to determine if a low or a logical "0" state exists. When these low or logical "0" conditions are present, the electric brake rate request comparator module EBRRC monitors the output electric brake feedback circuit check module EBFCC to ascertain that the electric brake feedback signal supplied by leads L48, L51 and L68 is not increasing or decreasing at a rate which is outside of the acceptable "jerk" limit range. This function is accomplished by monitoring any change in the electric brake feedback signal during specific time periods. If the electric brake feedback signal is within the acceptable "jerk" limit range, the electric brake rate request comparator circuit EBRRC outputs a low or a logical "0". Conversely, if the electric brake feedback signal is not within the acceptable "jerk" limit range, the electric brake rate request comparator circuit EBRRC outputs a high or a logical "1". The electric brake rate request comparator module EBRRC continues to monitor the electric brake feedback signal until the power/brake trainline circuit checks module PBTCC undergoes a transition from a high or logical "1" to a low or logical "0" or either the dead zero speed signal on terminal DZS or the wheel slip active signal on terminal WSA undergoes a transition to a high or a logical "1" state.

After a transition of the power/brake trainline circuit check monitor PBTCC from a low or logical "0" to a high or logical "1", the input signals on the dead zero speed terminal DZS and on the wheel slip active terminal WSA are monitored to determine if either of these signals is a low or logical "0". When the conditions are satisfied, the electric brake rate request comparator circuit EBRRC monitors the electric brake feedback signal to make sure that the signal does not increase or decrease at a rate that is outside the acceptable "jerk" limit range. If the signal is within the acceptable "jerk" limit range, the electric brake feedback rate request comparator EBREC outputs a low or a logical "0" to the interface health determination fault monitor circuit IHDFM via lead L73. The low or logical "0" signifies a normal mode of operation. For any other combination of inputs, the electric brake rate request comparator circuit EBRRC outputs a high or a logical "1" to the interface health determination fault monitor module IHDFM. The high or logical "1" indicates an error mode of operation.

It will be appreciated that brake level interface health check module BLIHC outputs a low or a logical "0" to the interface health determination fault monitor module IHDFM via lead L30 when a normal brake level demand signal is present. Conversely, the brake level interface health check module outputs a high or a logical "1" to IHDFM via lead L30 when an error condition has been initially diagnosed by the system. It will be seen that the power/brake interface health check module PBIHC outputs a low or logical "0" to the interface health determination fault monitor module IHDFM via lead L61 when a normal power/brake trainline signal is present. On the other hand, the power/brake interface health check module PBIHC outputs a high or a logical "1" to IHDFM via lead L61 when an error condition has been initially diagnosed by the system. It will be noted that the electric brake interface health check module EBIHC outputs a low or logical "0" to the interface health determination fault monitor module IHDFM via lead L63 when the electric brake feedback signal is found to be without propulsion faults. If the electric brake interface health check module EBIHC produces a high or a logical "1" signal to IHDFM via lead L63, an error condition has been initially diagnosed by the system. It will be noted that the interface health determination fault monitor module IHDFM checks the respective logical input signals received from the brake level interface health check circuit BLIHC, the power/brake interface health check circuit PBIHC, the electric brake interface health check circuit EBIHC and the electric brake rate request comparator circuit EBRRC. The logical input signals are analyzed and diagnosed by the interface health determination fault monitor circuit IHDFM which produces the appropriate outputs on the three RAM fault log terminals RFL4, RFL5 and RFL6 via leads L70, L71 and L72, respectively.

The following is a matrix of the inputs to the interface health determination fault monitor module IHDFM for analyzing and determining the errors which are to be reported to the event interface file, the RAM fault logs and which are displayed on a seven (7) segment display:

| IHDFM FAULT MATRIX | | | | | |
|---|---|---|---|---|---|
| PATTERN | BLIHC | PBIHC | EBIHC | EBRRC | FAULT |
| 1 | High | High | High | High | MFBF |
| 2 | High | High | High | Low | MFBF |
| 3 | High | High | Low | High | MFBF |
| 4 | High | High | Low | Low | MFBF |
| 5 | High | Low | High | High | MFBF |
| 6 | High | Low | High | Low | MFBF |
| 7 | High | Low | Low | High | MFBF |
| 8 | High | Low | Low | Low | BLDF |
| 9 | Low | High | High | High | MFBF |
| 10 | Low | High | High | Low | MFBF |
| 11 | Low | High | Low | High | MFBF |
| 12 | Low | High | Low | Low | PBTF |
| 13 | Low | Low | High | High | EBF |
| 14 | Low | Low | High | Low | EBF |
| 15 | Low | Low | Low | High | JLRF |
| 16 | Low | Low | Low | Low | No Fault |

As noted, the matrix outputs the specific faults generated by the interface health determination fault monitor module IHDFM and outputs the faults to the RAM fault log terminals RFL4, RFL5 and RFL6. The mnemonics for the high level faults are as follows:

| ACROYNM | DESCRIPTION |
|---|---|
| JLRF | Jerk Limit Range Fault |
| EBF | Electric Brake Fault |
| PBTF | Power Brake Trainline Fault |
| BLDF | Brake Level Demand Fault |
| MFBF | Multiple Friction Brake Fault |

Thus, the present invention has been described in such full, clear, concise, and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art and accordingly it is understood that the present invention should not be limited to the exact embodiment shown and described, but should be accorded the full scope and protection of the appended claims.

We claim:

1. A friction brake interface health check system for a multiple-axle railway vehicle comprising, first means responsive to a requested brake level demand signal for producing a first logical signal when a normal mode of operation exists and for producing a second logical signal when an error mode of operation exists, second means responsive to a power brake trainline signal for producing a first logical signal when a normal mode of operation exists and for producing a second logical signal when an error mode of operation exists, third means responsive to an electric brake feedback signal for producing a first logical signal when a normal mode of operation and for producing a second logical signal when an error mode of operation exists, fourth means for producing a first logical signal when the electric brake feedback signal is within an acceptable range and for producing a second logical signal when the electric brake feedback signal is outside of the acceptable range, and fifth means for monitoring the logical signals received from said first, second, third, and fourth means for developing a fault matrix which is used for analyzing and checking the health of the friction brake interface system.

2. The friction brake interface health check system for a multiple-axle railway vehicle as defined in claim 1, wherein said first means includes a brake level demand circuit check module.

3. The friction brake interface health check system for a multiple-axle railway vehicle as defined in claim 1, wherein said first means includes a brake level demand oscillation check circuit.

4. The friction brake interface health check system for a multiple-axle railway vehicle as defined in claim 1, wherein said first means includes brake level demand range determination circuit.

5. The friction brake interface health check system for a multiple-axle railway vehicle as defined in claim 1, wherein said first means includes a brake level demand timer circuit.

6. The friction brake interface health check system for a multiple-axle railway vehicle as defined in claim 1, wherein said first means includes a brake level interface health check circuit.

7. The friction brake interface health check system for a multiple-axle railway vehicle as defined in claim 1, wherein said second means includes a power/brake trainline circuit check module.

8. The friction brake interface health check system for a multiple-axle railway vehicle as defined in claim 1, wherein said second means includes a power/brake trainline oscillation check circuit.

9. The friction brake interface health check system for a multiple-axle railway vehicle as defined in claim 1, wherein said second means includes a power/brake trainline timer circuit.

10. The friction brake interface health check system for a multiple-axle arailway vehicle as defined in claim 1, wherein said second means includes a power/brake interface health check circuit.

11. The friction brake interface health check system for a multiple-axle railway vehicle as defined in claim 1, wherein said third means includes an electric brake feedback circuit check module.

12. The friction brake interface health check system for a multiple-axle railway vehicle as defined in claim 1, wherein said third means includes an electric brake feedback oscillation check circuit.

13. The friction brake interface health check system for a multiple-axle railway vehicle as defined in claim 1, wherein said third means includes an electric brake feedbakc rate check circuit.

14. The friction brake interface health check system for a multiple-axle railway vehicle as defined in claim 1, wherein said third means includes electric brake interface health check circuit.

15. The friction brake interface health check system for a multiple-axle railway vehicle as defined in claim 1, wherein said fourth means includes a requested brake rate calculator circuit.

16. The firction brake interface health check system for a multiple-axle railway vehicle as defined in claim 1, wherein said fourth means includes an electric brake rate request comparator circuit.

17. The friction brake interface health check system for a multiple-axle railway vehicle as defined in claim 1, wherein said fifth means includes an interface health determination fault monitor circuit.

18. A system for dynamically diagnosing the existence of a signal fault condition in friction brake equipment comprising, a brake level demand circuit check module being connected to a brake level demand oscillation check circuit and to a brake level demand range determination circuit, said brake level demand range determination circuit being connected to a brake level demand timer circuit, said brake level demand oscillation check circuit, said brake level demand range determination circuit, and said brake level demand timer circuit being connected to a brake level interface health check circuit which is connected to an interface health determination fault monitor circuit, a power/brake trainline circuit check module being connected to a power/brake trainline oscillation check circuit and to a power/brake trainline timer circuit, said power/brake trainline oscillation check circuit and said power/brake trainline timer circuit being connected to a power/brake interface health check circuit which is connected to said interface health determination fault monitor circuit, an electric brake feedback circuit check module being connected to an electric brake feedback oscillation check circuit and to an electric brake feedback rate check circuit, said electric brake feedback oscillation check circuit and said electric brake feedback rate check circuit being connected to an electric brake interface health check circuit which is connected to said interface health determination fault monitor circuit, a requested brake rate calculator circuit being connected to an electric brake rate request comparator circuit which is connected to said interface health determination fault monitor circuit which monitors and dynamically diagnoses the specific failure characteristics of each of a plurality of friction brake interface input signals of the system.

* * * * *